(12) United States Patent
Langer et al.

(10) Patent No.: US 8,523,447 B2
(45) Date of Patent: Sep. 3, 2013

(54) WHEEL BEARING ARRANGEMENT HAVING GASKET

(75) Inventors: Roland Langer, Schwanfeld (DE); Peter Niebling, Bad Kissingen (DE); Sebastian Lorenz, Rothenkirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/122,014

(22) PCT Filed: Sep. 28, 2009

(86) PCT No.: PCT/EP2009/062494
§ 371 (c)(1),
(2), (4) Date: Mar. 31, 2011

(87) PCT Pub. No.: WO2010/040650
PCT Pub. Date: Apr. 15, 2010

(65) Prior Publication Data
US 2011/0182538 A1    Jul. 28, 2011

(30) Foreign Application Priority Data
Oct. 9, 2008   (DE) .................. 10 2008 051 065

(51) Int. Cl.
*F16C 33/78* (2006.01)
*F16C 35/04* (2006.01)
(52) U.S. Cl.
USPC ............ 384/478; 384/477; 384/488; 384/589

(58) Field of Classification Search
USPC ................. 384/477–479, 482, 484, 486, 544, 384/589
See application file for complete search history.

(56) References Cited

U.S. PATENT DOCUMENTS

| | | | | | |
|---|---|---|---|---|---|
| 2,639,954 | A | * | 5/1953 | Potter | 384/484 |
| 4,118,080 | A | * | 10/1978 | Kregler et al. | 384/482 |
| 4,372,628 | A | * | 2/1983 | Kiener et al. | 384/476 |
| 4,408,809 | A | * | 10/1983 | Walter et al. | 384/486 |
| 4,545,692 | A | * | 10/1985 | Bras et al. | 384/479 |
| 5,454,647 | A | * | 10/1995 | Otto | 384/486 |
| 7,393,140 | B2 | * | 7/2008 | Norimatsu et al. | 384/544 |

FOREIGN PATENT DOCUMENTS

| | | |
|---|---|---|
| DE | 92 03 402.0 U1 | 4/1992 |
| JP | 2005 147298 A | 6/2005 |
| JP | 2006 010055 A | 1/2006 |
| JP | 2006 132618 A | 5/2006 |

* cited by examiner

*Primary Examiner* — Marcus Charles
(74) *Attorney, Agent, or Firm* — Lucas & Mercanti, LLP

(57) ABSTRACT

A wheel bearing arrangement that has a wheel hub, which is operatively connected to an outer ring by way of rolling elements and a wheel flange. The wheel flange, together with a protective ring forms a first gasket. The protective ring surrounding the outer ring of the wheel hearing arrangement. This approach is of particular interest for non-driven wheel bearing arrangements in which the side of the wheel bearing facing the vehicle can be protected by a cover used on the vehicle side.

13 Claims, 3 Drawing Sheets

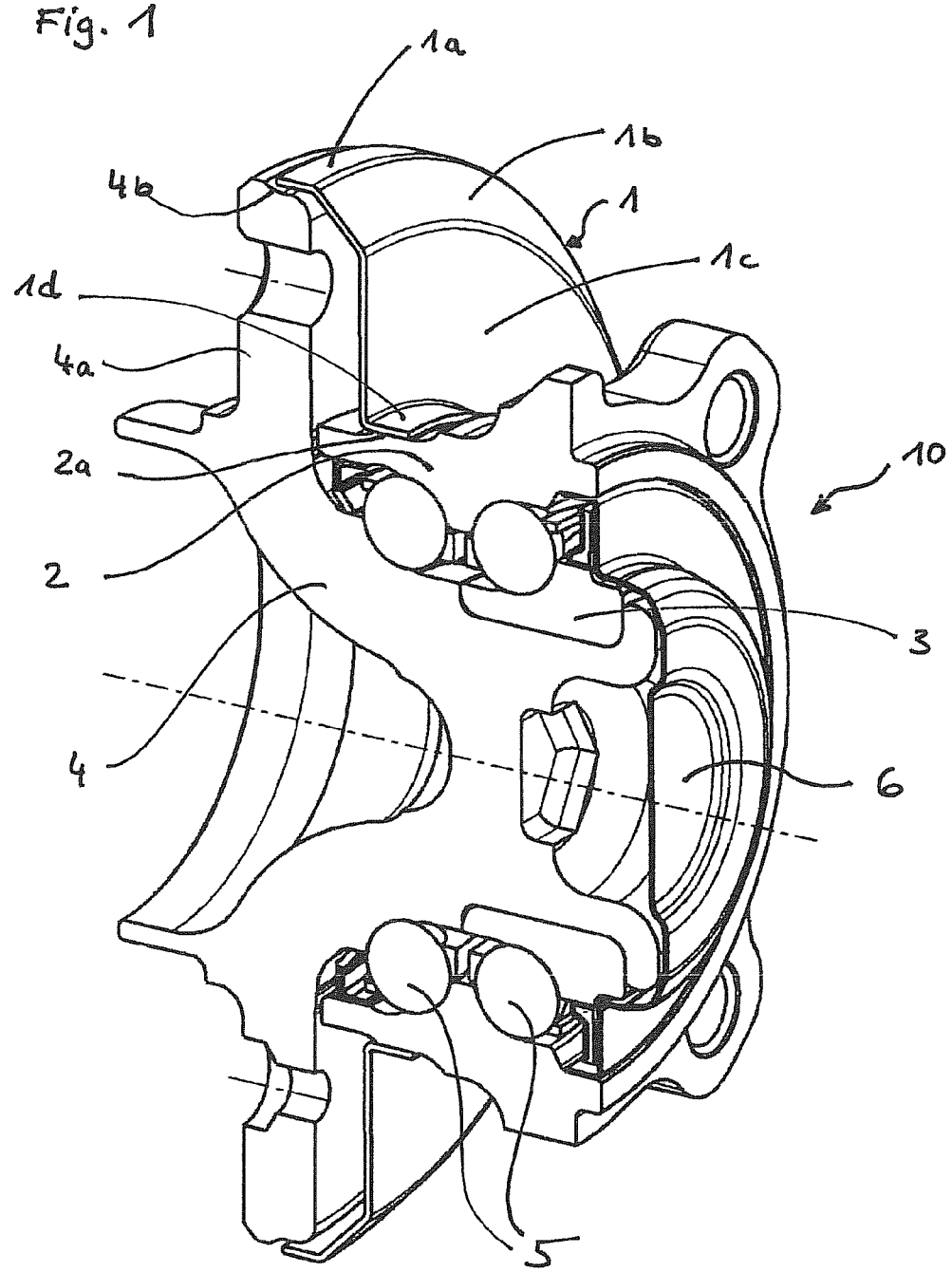

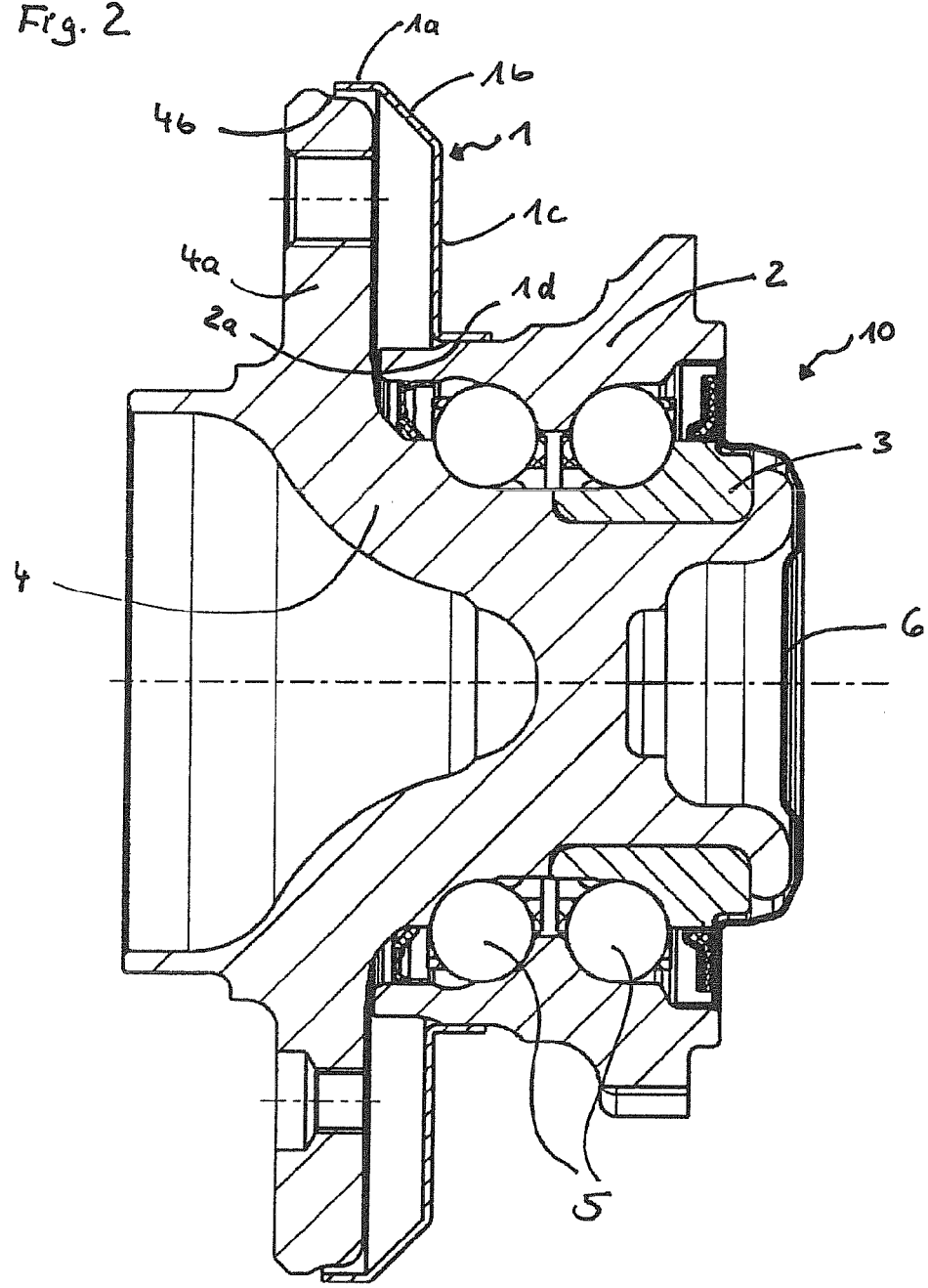

WHEEL BEARING ARRANGEMENT HAVING GASKET

CROSS-REFERENCE TO RELATED APPLICATIONS

This application is a 371 of PCT/EP2009/062494 filed Sep. 28, 2009, which in turn claims the priority of DE 10 2008 051 065.3 filed Oct. 9, 2008, the priority of both applications is hereby claimed and both applications are incorporated by reference herein.

DESCRIPTION

1. Field of the Invention

The invention relates to a wheel bearing arrangement having a wheel hub which is operatively connected to an outer ring by means of rolling elements and has a wheel flange.

2. Background of the Invention

Such a wheel bearing arrangement is generally used in utility vehicles (PKW) and has a wheel-side seal arrangement and a vehicle-side seal arrangement, which seal arrangement protects the wheel bearing against environmental influences, in particular moisture and particles of dirt. Both seal arrangements, which are realized, for example, as a cartridge seal or as a combination of arrangements composed of individual carrier rings and slinger rings have, in addition to their sealing function, further properties such as, for example, sufficient resistance to heat and low manufacturing costs.

As the debate about raw materials continues, ever more stringent requirements are being made of the friction properties of seal arrangements. On the one hand, a large number of sealing lips, in particular radial sealing lips, permit a strong sealing effect. On the other hand, a large number of slipping sealing contacts leads to increased frictional torque. Efforts to reduce the friction of the seal arrangement have often resulted in a desire to move away from radial sealing lips. However, it is not always possible to dispense with radial sealing lips owing to the sealing effect which has to be achieved. In other words, the balance always has to be struck between being able to do without a strong sealing effect in order to save fuel and accepting the increased fuel consumption.

DE 92 03 402.0 U1 discloses a seal for wheel bearings of motor vehicles which is provided for the wheel-side sealing of the wheel bearing. This wheel-side seal arrangement includes a carrier ring and an elastic ring with a radial sealing lip and an axial sealing lip, as well as a further elastic ring which, together with the outer ring of the bearing, forms a collection channel for water and particles of dust.

SUMMARY OF THE INVENTION

The invention is based on the object of specifying a wheel bearing seal arrangement which achieves a strong sealing effect with low friction in the case of a wheel-side seal arrangement.

This object is achieved in a wheel bearing arrangement of the type specified at the beginning by virtue of the fact that the wheel flange forms a first seal together with a protective ring which surrounds the outer ring.

The invention is based on the object that the wheel flange which is present in any case on the wheel bearing arrangement can be used to improve the seal of the wheel-side seal arrangement to a greater degree, and the wheel-side seal arrangement does not only have to function essentially between the outer ring and the wheel hub, or between the outer ring and the inner ring.

According to the invention, the wheel-side seal arrangement extends away from the rotational axis, in a predominantly radial direction from the location of the commercially available seal arrangements. In this context, a protective ring covers the wheel flange at least largely on the side thereof facing the vehicle. The opening between the outer ring and the wheel hub, which at this point forms a junction between the hollow-cylinder-like section in the wheel flange, is likewise at least largely covered by the protective ring. The wheel-side seal arrangement can be embodied as a complete seal, i.e. if appropriate also with one or more sealing lips in the region of the wheel flange, or as a combination of a seal in the region of the wheel flange with a conventional friction-reduced cartridge seal or with any other friction-reduced internal seal which is located radially within the outer ring.

The wheel flange and the protective ring advantageously form, in the sense of a (non-slipping) labyrinth seal, a first seal which is to be considered to be a pre-seal, and which achieves its sealing effect together with a low-friction seal between the outer ring and the inner ring, or the outer ring and the wheel hub. The advantage of a contactless, first seal is that no further friction is generated even though an additional sealing effect is produced.

The protective ring is advantageously provided for attachment to the outer ring. For example, what is referred to as a form fit of the protective ring on the outer ring is suitable in this context. However, other attachment methods which are customary with wheel bearings are also conceivable. In this context, an outer ring which has faces with different radii on its radially outer circumferential side is particularly advantageous in this context, said radii effectively assisting the positioning of the protective ring during the installation process and preventing the protective ring from slipping.

The protective ring is advantageously connected integrally to the outer ring. As a result, at least one installation step is dispensed with and a long-term seal between the components can be ensured because potential scratches to a form fit can lead to rust infiltration and cannot be completely ruled out owing to the integrated nature of the components.

The protective ring advantageously has at least one hollow-cylindrical, annular-disk-shaped, cone-segment-shaped or toroidal-segment-shaped section which is similar to the specified sections, or a combination of such sections. At this point, the first seal can be used in a very flexible way, especially since the space which is taken up can be kept small by suitable selection of the shape of the protective ring. The further elements are to be mounted within the first seal (collection channel, collecting spaces, etc.), which process can also be assisted by corresponding selection of the shape of the protective ring. If none of the specified criteria is significant, it is appropriate, for the sake of simplicity, to use annular-disk-shaped and hollow-cylindrical molded components. Otherwise, toroidal-segment-shaped or cone-segment-shaped molded components are to be preferred to the latter.

The seal gap opening of the first seal is advantageously entirely or partially oriented toward the wheel rim. In this case, the mouth openings of the seal gap are oriented in a direction from which only a very small volume of spray water and particles of dirt can be expected. This effect can be enhanced further by keeping the seal gap opening as small as possible.

The seal gap opening is advantageously partially formed by a circumferential face of the wheel flange. In this way, the seal gap opening is at a very long distance from the point which is actually to be sealed. Furthermore, the circumferential face which is present in any case can be used to form the seal gap opening. If appropriate, the sealing effect can be assisted by giving the circumferential face a certain shape.

The seal gap opening is advantageously arranged essentially axially in the center of the circumferential face of the wheel flange. It is therefore possible to maintain the orientation of the seal opening with respect to the wheel rim and at the same time provide a part of the wheel flange for centrifugally ejecting water and particles of dirt. This can be done, for example, by means of a ring-like extension, in the form of a radial protrusion, which is positioned between the wheel rim and the seal opening.

In one advantageous embodiment, the wheel bearing arrangement has a second, in particular low-friction, seal which has an axial sealing lip, wherein the seal is arranged between the wheel hub and the outer ring, or inner ring and outer ring. Since a sealing effect is already present owing to the first seal, it is possible to use the second seal with a reduced sealing effect, said seal having lower friction. Here, a second seal which has one, two or even more axial sealing lips is also appropriate.

Accordingly, one, two or more radial sealing lips can also be provided in order to manufacture a seal arrangement which achieves a very high sealing effect with a first and a second seal.

The wheel bearing arrangement according to the invention can advantageously be used for driven wheel bearings, but also in particular also for non-driven wheel bearings. In the case of non-driven wheel bearings, it is possible to use, for example, a cover solution in order to achieve a similarly high sealing effect also at the vehicle-side (i.e. transmission-side) seal, wherein the cover ends flush with the outer ring in a seal-forming fashion.

BRIEF DESCRIPTION OF THE DRAWINGS

Further advantageous embodiments and preferred developments of the invention can be found in the description of the figures and/or the dependent claims.
In the drawings:

FIG. 1 shows a three-dimensional, sectional view of a first third-generation wheel bearing arrangement with a protective ring, FIG. 2 shows a further sectional view of the first wheel bearing arrangement from FIG. 1.

DETAILED DESCRIPTION OF THE INVENTION

Figure 4:
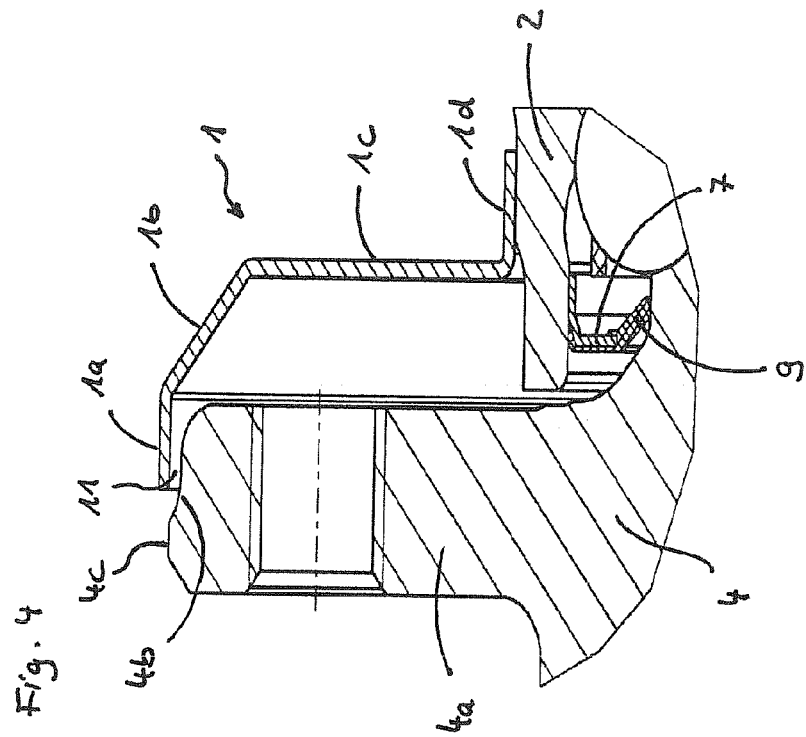
FIG. 4 shows a two-dimensional detail of the first wheel bearing arrangement from FIG. 1 with a radial sealing lip.

FIGS. 1 and 2 show a third-generation first wheel bearing arrangement 10 with a protective ring 1.

The first wheel bearing arrangement 10 is a non-driven, two-row wheel bearing unit with an increased sealing effect. It is composed, inter alia, of a wheel hub 4 which is provided for transmitting wheel forces from the wheel flange 4a via the rolling elements 5, or also via an inner ring 3. The wheel bearing unit is a third-generation wheel bearing arrangement 10, that is to say the outer ring 2 can be screwed onto a wheel carrier, as can also the wheel hub 4 be screwed onto a wheel rim by means of the wheel flange 4a which is connected integrally to said wheel hub 4.

The wheel bearing unit is protected very intensively against environmental influences. On the vehicle side, a cover 6 is connected to an inner side of the outer ring 2 in a seal-forming fashion, if appropriate by means of a form fit. Since this wheel bearing unit is a non-driven wheel bearing unit, the sealed connection facing the vehicle can be implemented in a comparatively easy fashion with a strong sealing effect. An increased sealing effect becomes all the more necessary at the wheel-side seal in order equally to be able to prevent the penetration of moisture and particles of dust on both sides. For this purpose, a protective ring 1 is used which is constructed from two hollow-cylindrical sections 1a, 1d, an annular-disk-shaped section 1c and a cone-segment-shaped section 1b.

The protective ring 1 which surrounds the outer ring 2 forms, with the wheel flange 4a, a gap seal which constitutes a pre-seal without slipping sealing lips. The hollow-cylindrical section 1d is used to secure the protective ring 1 on the outer ring 2 by means of form fit. The annular-disk-shaped section 1c connects, together with the cone-segment-shaped section 1b, the two hollow-cylindrical sections 1a and 1d to one another.

Owing to the angle which the sections 1d and 1c enclose with one another, a certain dimensional stability is produced, which makes, in particular, the hollow-cylindrical section 1a very positionally secure even though the latter is relatively far from the attachment to the outer ring 2 by means of the hollow-cylindrical section 1d. This prevents the seal gap opening 11 from widening unnecessarily during operation.

As a result, the pre-seal forms, with the circumferential face 4c of the wheel flange 4a and the hollow-cylindrical section 1a of the protective ring 1, an axial part of a seal gap. A radial part of the seal gap is formed by the wheel flange 4a and the sections 1a, 1b and 1c. In this context, the space required for the protruding part of the wheel screw (not depicted) can also be formed by the sections, i.e. in particular in section 1b a larger seal gap with the flange 4a is formed than in the sections 1a and 1c.

The section 1a advantageously forms the seal gap with the flange 4a and a braking arrangement, in particular with a brake disk (not depicted). The seal gap is therefore continued radially, with the seal gap opening being oriented in an axial direction.

The radius of the bearing face 2a of the outer ring 2 is larger than the radius of the outer face which is located further toward the wheel flange 4a, but is smaller than the radius of the outer face of the outer ring 2 which is located toward the vehicle. This step-like arrangement of the outer face makes the installation of the protective ring 1 significantly easier.

Figure 3:
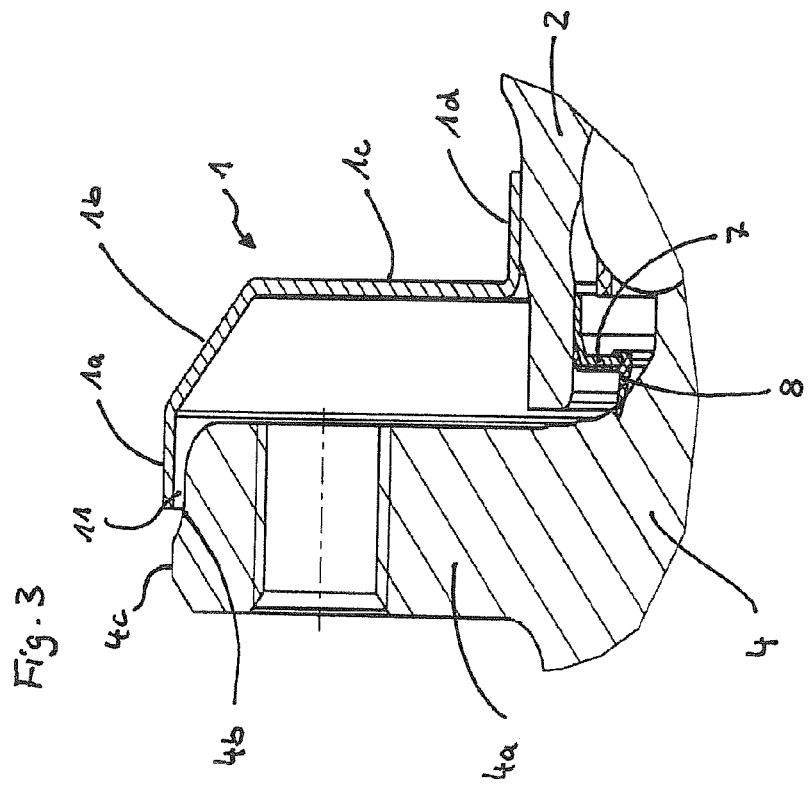
FIG. 3 shows a two-dimensional detail from a second wheel bearing arrangement with an axial sealing lip.

FIG. 3 shows a two-dimensional detail of a second wheel bearing arrangement with an axial sealing lip 8. The second wheel bearing arrangement is identical to the first wheel bearing arrangement from FIG. 1, with the exception of the sealing lip. The second wheel bearing arrangement is, in contrast to the first, not a radial sealing lip 9 but rather an axial sealing lip 8 which is held by the carrier part 7. The carrier part 7 is in turn attached to an inner side of the outer ring 2. The second seal is therefore formed essentially by the carrier part 7 and the axial sealing lip 8.

The second wheel bearing arrangement with the axial sealing lip 8 therefore constitutes a very low-frictional wheel bearing unit which promises low fuel consumption ($CO_2$ reduction) owing to the low frictional torque. Owing to the pre-seal as a result of the interplay between the wheel flange 4a and the protective ring 1, only one axial sealing lip is necessary in the entire seal arrangement of the wheel bearing unit. In conventional seal arrangements, the use of just one axial sealing lip has hitherto generally been too little to ensure an acceptable service life of the wheel bearing unit. However, this is now possible owing to the pre-seal.

FIG. 4 shows a two-dimensional detail of the first wheel bearing arrangement from FIG. 1 with a radial sealing lip 9 which is attached to the carrier part 7. The first wheel bearing arrangement is an arrangement which provides a strong seal overall. Despite the pre-seal which is used, the radial sealing lip 9 is not dispensed with.

The seal gap arrangement 11 is advantageously formed not only by the hollow-cylindrical section 1a of the protective ring 1 with the circumferential face 4b of the wheel flange 4a but also by a flange protrusion 4c which is integrally formed onto the part of the circumferential face 4b facing the wheel. The variation in the radial distance of the flange protrusion 4c from the rotational axis allows the orientation of the seal gap opening 11 to be varied. If the radius of the flange protrusion 4c is approximated to the radius of the circumferential face 4d, the seal opening 11 is oriented axially in the direction of the rim (not depicted). In the case of relatively large radii of the flange protrusion 4c, the direction of the seal gap opening 11 is partially oriented radially outward and encloses an angle with the rotational axis.

In addition, the flange protrusion 4c can be used as a predetermined dripping point, in particular when spray water drips off centrifugally. In addition, it is conceivable that water which has already penetrated into the seal gap flows driven radially outward to the flange protrusion 4c via the axial part of the seal gap as a result of the centrifugal force, and drips off, or is ejected, from there.

It is to be noted that the taught exemplary embodiment and the features thereof can be combined with one another in order to arrive at other developments according to the invention. For example, the exemplary embodiments of FIGS. 3 and 4, can be combined with one another to the effect that both a radial sealing lip 9 and an axial sealing lip 8 are used.

Wherever a description of figures does not include discussion of the reference symbols of the figures in question, the statements relating to the denoted subject matter from the descriptions of the other figures apply.

To summarize, the invention relates to a radial bearing arrangement 10 with a wheel hub 4 which is operatively connected to an outer ring 2 by means of rolling elements 5 and has a wheel flange 4a. The objective is to implement a lower frictional torque with the same or an improved sealing effect. For this purpose, the wheel flange 4a forms, together with a protective ring 1, a first seal, wherein the protective ring 1 comprises the outer ring 2 of the wheel bearing arrangement. This solution is interesting in particular in non-driven wheel bearing arrangements in which the side of the wheel bearing facing the vehicle can be protected very satisfactorily by a vehicle-side cover solution.

LIST OF REFERENCE NUMERALS

1 Protective Ring
1a Hollow-Cylindrical Section
1b Cone-Segment-Like Section
1c Annular Section
1d Hollow-Cylindrical Section
2 Outer Ring
2a Bearing Face
3 Inner Ring
4 Wheel Hub
4a Wheel Flange
4b Circumferential Face
4c Flange Protrusion
5 Rolling Element
6 Cover
7 Carrier Part
8 Axial Sealing Lip
9 Radial Sealing Lip
10 Wheel Bearing Arrangement
11 Seal Gap Opening

The invention claimed is:

1. A wheel bearing arrangement, comprising:
an outer ring;
a wheel hub inside the outer ring, said wheel hub having a wheel flange extending radially from the wheel hub and radially outward from said outer ring, said wheel flange having first and second opposing sides, a circumferential face and a flange protrusion extending radially outward from the circumferential face;
rolling elements between the wheel hub and the outer ring to operatively connect the wheel hub to the outer ring; and
a protective ring surrounding the outer ring, said protective ring extending radially from the outer ring to said circumferential face of said wheel flange and covering the first of said opposing sides of said wheel flange,
said protective ring having a hollow cylindrical section that forms a first seal for said rolling elements of said wheel bearing arrangement with the circumferential face and the flange protrusion, wherein the flange protrusion is arranged between an end of the hollow cylindrical section and the second of the opposing sides of said wheel flange.

2. The wheel bearing arrangement as claimed in claim 1, wherein the first seal is a contactless seal.

3. The wheel bearing arrangement as claimed in claim 1, wherein the protective ring attaches to the outer ring.

4. The wheel bearing arrangement as claimed in claim 3, wherein the protective ring attaches to the outer ring by a form fit.

5. The wheel bearing arrangement as claimed in claim 1, wherein the protective ring is connected integrally to the outer ring.

6. The wheel bearing arrangement as claimed in claim 1, wherein the protective ring has at least one of the sections in the group consisting of an annular-disk-shaped section, and a cone-segment-shaped section.

7. The wheel bearing arrangement as claimed in claim 1, further comprising a seal gap opening oriented entirely or partially toward the wheel flange.

8. The wheel bearing arrangement as claimed in claim 7, wherein the seal gap opening is partially formed by the circumferential face of the wheel flange and the flange protrusion.

9. The wheel bearing arrangement as claimed in claim 8, wherein the seal gap opening is arranged substantially axially in a center of the circumferential face of the wheel flange.

10. The wheel bearing arrangement as claimed in claim 1, further comprising a second seal having a carrier part attached to an inner side of the outer ring and a an axial sealing lip arranged between the wheel hub and the outer ring, sealing a rolling element space.

11. The wheel bearing arrangement as claimed in claim 10, wherein the second seal is a low-friction seal.

12. The wheel bearing arrangement as claimed in claim 10, wherein the sealing lip is an axial sealing lip.

13. The wheel bearing arrangement as claimed in claim 10, wherein the sealing lip is a radial sealing lip.

* * * * *